Aug. 3, 1943.  M. FLEISCHER  2,325,761
CALCULATOR
Filed Aug. 8, 1941

INVENTOR
MAX FLEISCHER
BY Horridge and Dowd
ATTORNEYS

Patented Aug. 3, 1943

2,325,761

UNITED STATES PATENT OFFICE 2,325,761

CALCULATOR

Max Fleischer, Miami Beach, Fla.

Application August 8, 1941, Serial No. 405,977

6 Claims. (Cl. 235—88)

This invention relates to calculations and has for an object to provide in such a device a ready means for handicapping racing dogs on the basis of their past performances, whereby the several factors entering into the computation, such as the number of races won, the number of races in which the dog has started, and the position which the dog is going to occupy at the start of the race relative to the inside rail, of the track may be quickly given effect and the resultant seen at a glance. A further object is to provide such a device which will be simple to operate, and inexpensive to manufacture, consisting of but few parts.

Figure 1:
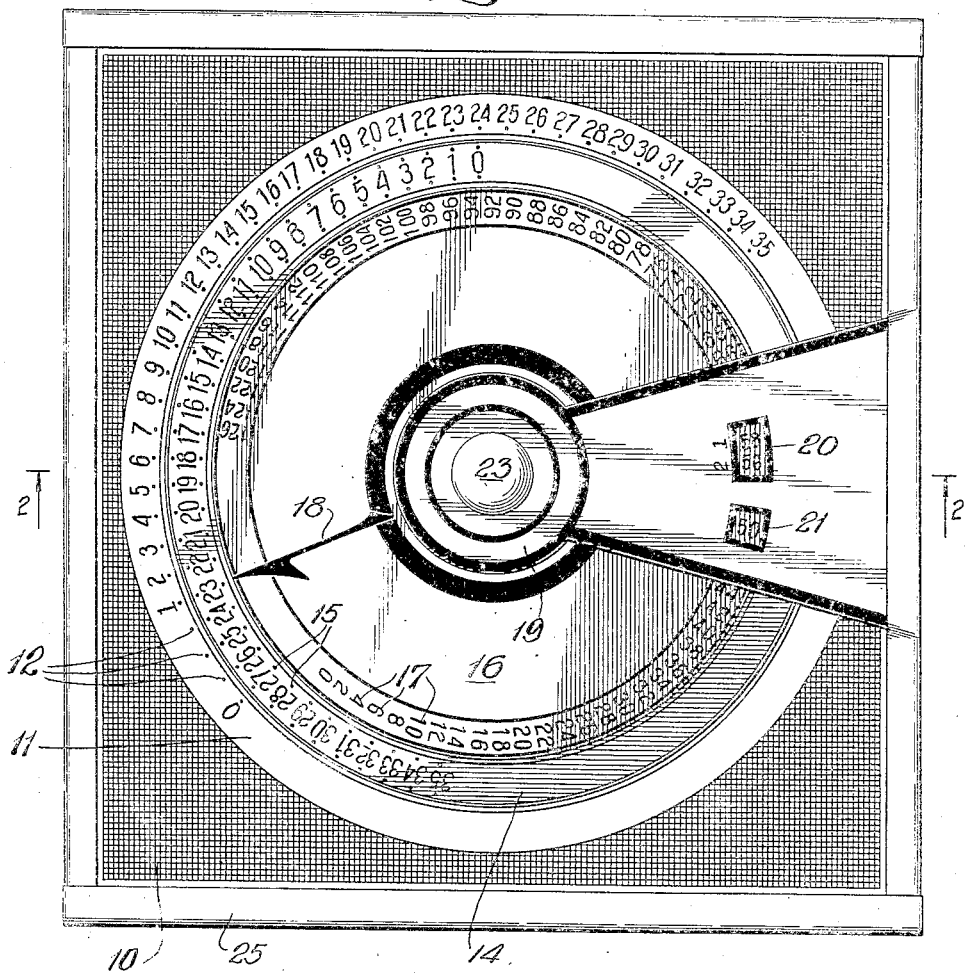
Figure 2:
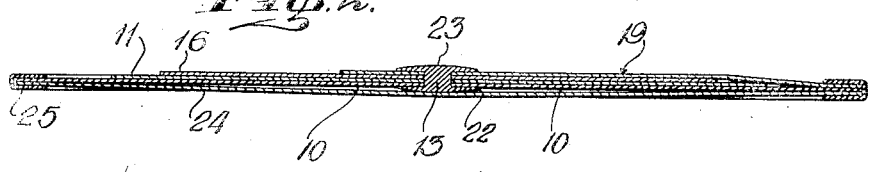

Other objects and advantages will be apparent from the following description of it taken in conjunction with the accompanying drawing, in which Fig. 1 is a plan view of the calculator and Fig. 2 is a cross section on the line 2—2 of Fig. 1.

Referring to the drawing, 10 is a square baseplate, made of suitable material, such as cardboard or Celluloid, upon which may be printed or engraved the annular dial 11 composed of a series of index points 12, numbered consecutively from zero to 35, disposed equidistant arcuately about a portion of the margin of said dial 11, except that the zero point is removed four points from the index point associated with the number "1."

Concentrically and rotatably mounted on a center post 13 extending through the center of the annular dial 11 is a circular dial 14 composed of a thin sheet of Celluloid having the same diameter as that of the inner periphery of the annular dial 11 and provided along its peripheral margin with a series of index points 15, likewise numbered consecutively from zero to 35 but running in the opposite direction to the numbers on the dial 11 and without any intervening spaced points between the zero and the number "1." The arcuate spacing of the numbered points 15 is the same as that of the points 12 so that they may be brought into radial alinement with each other. A third circular dial 16 is rotatably mounted on the center post 13 in superimposed relation to the dials 11 and 14 and is provided about the greater portion of its peripheral margin with a series of numbers 17 running from zero, by even numbers, to 126, and in the same direction as the numbered points 15 on the dial 14, and are also similarly arcuately spaced. The diameter of the dial 16 is sufficiently smaller than that of the dial 14 to expose to view the numbered points 15. Positioned intermediate the zero and the number "126" on the dial 16 is a radial pointer 18 which may be brought into register with any of the numbered points 15 on the dial 14.

19 is a bridging member formed in part of a small circular disc of Celluloid rigidly mounted on the center post 13 on top of and concentric with the dials 11, 14 and 16, and extending, from a portion of the circumference of said disc over the said dials 11, 14 and 16, with its side edges diverging, to the edge of the base plate 10 where it is securely fastened, thus holding the rotatable dials 14 and 16 in substantially the same plane with the dial 11 and preventing any tendency of them to curl up.

Cut out windows 20 and 21 are formed in said bridging member in register with the numbers 17 on the dial 16. The window 20 is of sufficient size to disclose to view simultaneously any adjoining two of said numbers 17 while the window 21 is spaced therefrom a distance equal to the spacing of two of the numbers 17 and is of a size sufficient to disclose to view only one of said numbers.

The center post 13 is provided with headed portions 22 and 23 between which are held the base plate 10, the rotatable dials 14 and 16 and the bridging member 19 as tightly together as is consistent with the free rotatability of the dials 14 and 16. A sheet 24 of pasteboard or the like serves to cover the bottom of the base plate 11 and the head 22 of the center post 13, and a U-shaped strip of cardboard 25 extending around the base plate 10 serves to bind the outer end of the bridging member 19 thereto.

While I have mentioned cardboard or Celluloid as the materials out of which the various parts of the device may be made, it is obvious that thin metal or any other suitable material may be used instead.

From the foregoing description it will be seen that I have provided a simple and compact device whereby the following calculations may be readily and quickly made in accordance with the following manner of its use.

As is well known, records are kept of the past performance of a racing dog in terms of the number of races in which he has competed and the order in which he finished in each of the said prior races. Take, for instance, the case of a racing dog which has competed in twenty-three races and came in first, second or third in twelve of such races. Any of these positions may be considered the winning of a race for the purpose of this invention. The operator of the device rotates the dial 14 until the point numbered "12" thereon comes into register with the point numbered "12" on the dial 11. Then holding said dial 14 in that position he rotates the dial 16 until the pointer 18 comes into position opposite the number "23," and that racing dog's comparative rating is shown in the windows 20 and 21. Since in dog races, the dogs follow a mechanical rabbit mounted on the end of a travelling boom adjacent the inside rail of the track, a racing dog's chance of winning is affected by the position he will occupy at the start of the race, the first or nearest to the inside rail position being considered the best, the next position away from said rail being slightly less advantageous and the positions further removed being equally and more disadvantageous, so that with the dials arranged as aforesaid the racing dog's rating will be seen to be 58 if he will start from the first position with reference to the inside rail, 56 if he will start from the second position and 50 if his starting position is further removed from the inside rail. This adds a further refinement to the calculation of the dog's rating for handicap purposes.

It will be noted that due to the numbered points 15 on dial 16 running in the opposite direction to the numbered points 12 on the dial 11, it requires a rotation of two points of the dial 14 for each additional race won or lost out of the same number of races in which the dog has been started, and that since the numbers 17 on the dial 16 consists only of even numbers the result in the windows 20 and 21 will be a change of four points for each race won or lost out of the same number of starts. Again, a rotation of the pointer 18 for each additional or less number of starts in which the dog has won the same number of races will subtract or add two points to his rating. Due to the positioning of the zero mark on dial 11 four points removed from the "1" on said dial a dog's rating jumps eight points for the first race won, that is to say, if he lost his first race his rating as indicated in the first position in the window 20 would be 48 whereas if he then won his second race he would be credited with a rating of 56.

The device is operated in a similar way for each dog in the race to be run and their relative ratings form the basis for handicapping them, by the addition of weight to be carried or otherwise.

What I claim is:

1. A device for calculating the relative chances of contestants in a race comprising a base plate having imprinted thereon an annular dial divided into a plurality of equally spaced index points consecutively numbered in one direction and indicating the number of races won by a selected contestant, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, a third dial of a smaller diameter than said second dial rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, pointer means radially disposed on said third dial between the highest and lowest numbers of said series of even numbers and adapted for visual radial alignment with the spaced index points on said second dial, a bridging member extending from said post over said dials and rigidly fastened to said base plate and a window in said bridging member adapted to disclose one of said even numbers on said third dial as determined by the simultaneous alignment of a selected numbered index point on said second dial with a similarly numbered index point on said first dial and of said pointer means with a selected numbered index point on said second dial.

2. A device for calculating the relative chances of contestants in a race comprising a base plate having imprinted thereon an annular dial divided into a plurality of equally spaced index points consecutively numbered in one direction and indicating the number of races won by a selected contestant, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, a third dial of a smaller diameter than said second dial rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, pointer means radially disposed on said third dial between the highest and lowest numbers of said series of even numbers and adapted for visual radial alignment with the spaced index points on said second dial, a bridging member extending from said post over said dials and rigidly fastened to said base plate and two spaced apart windows in said bridging member, one of which is adapted to disclose one of said even numbers on said third dial and the other of which is adapted to disclose two of said even numbers, as determined by the simultaneous alignment of a selected numbered index point on said second dial with a similarly numbered index point on said first dial and of said pointer means with a selected numbered index point on said second dial.

3. A device for calculating the relative chances of contestants in a race comprising a base plate having imprinted thereon an annular dial divided into a plurality of equally spaced index points consecutively numbered in one direction and indicating the number of races won by a selected contestant, the lowerst numbered index point being, however, separated from the next higher index point a distance greater than the space between two index points, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, except that said displacement from a position where the lowest numbered index points on said respective dials are in alignment to a position where the next higher numbered index points on said respective dials are in alignment will be equal to more than the space between two index points, a third dial of a smaller diameter than said second dial rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, pointer means radially disposed on said third dial between the highest and lowest numbers of said series of even numbers and adapted for visual radial alignment with the spaced index points on said second dial, a bridging member extending from said post over said dials and rigidly fastened to said base plate and a window in said bridging member adapted to disclose one of said even numbers on said third dial as determined by the simultaneous alignment of a selected numbered index point on said second dial with a similarly numbered index point on said first dial and of said pointer means with a selected numbered index point on said second dial.

4. A device for calculating the relative chances of contestants in a race comprising a base plate having imprinted thereon an annular dial divided into a plurality of equally spaced index points consecutively numbered in one direction and indicating the number of races won by a selected contestant, the lowest numbered index point being, however, separated from the next higher index point a distance greater than the space between two index points, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, except that said displacement from a position where the lowest numbered index points on said respective dials are in alignment to a position where the next higher numbered index points on said respective dials are in alignment will be equal to more than the space between two index points, a third dial of a smaller diameter than said second dial rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, pointer means radially disposed on said third dial between the highest and lowest numbers of said series of even numbers and adapted for visual radial alignment with the spaced index points on said second dial, a bridging member extending from said post over said dials and rigidly fastened to said base plate and two spaced apart windows in said bridging member, one of which is adapted to disclose one of said even numbers on said third dial and the other of which is adapted to disclose two of said even numbers, as determined by the simultaneous alignment of a selected numbered index point on said second dial with a similarly numbered index point on said first dial and of said pointer means with a selected numbered index point on said second dial.

5. A device for calculating the relative chances of contestants in a race comprising a base plate having imprinted thereon an annular dial divided into a plurality of equally spaced index points consecutively numbered in one direction and indicating the number of races won by a selected contestant, the lowest numbered index point being, however, separated from the next higher index point a distance greater than the space between two index points, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, except that said displacement from a position where the lowest numbered index points on said respective dials are in alignment to a position where the next higher numbered index points on said respective dials are in alignment will be equal to more than the space between two index points, a third dial of a smaller diameter than said second dial rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, pointer means radially disposed on said third dial between the highest and lowest numbers of said series of even numbers and adapted for visual radial alignment with the spaced index points on said second dial, a bridging member formed in part of a circular disc mounted on said post with a portion thereof extending, with its sides divergent, from a part of the circumference of said disc over said dials to one edge of the base plate, means for binding the outside edge of said portion of said bridging member to the edge of said base plate and two spaced apart windows in said bridging member, one of which is adapted to disclose one of said even numbers on said third dial and the other of which is adapted to disclose two of said even numbers, as determined by the simultaneous alignment of a selected numbered index point on said second dial with a similarly numbered index point on said first dial and of said pointer means with a selected numbered index point on said second dial.

6. A device for calculating the relative chances of contestants in a race comprising a base plate having imprinted thereon an annular dial divided into a plurality of equally spaced index points consecutively numbered in one direction and indicating the number of races won by a selected contestant, the lowest numbered index point being, however, separated from the next higher index point a distance greater than the space between two other index points, a post extending through the center of said dial, a second dial of a smaller diameter than said first dial rotatably mounted on said post in superposed relation to said first dial and provided along its circumference with equally spaced index points adapted for visual radial alignment with said first mentioned index points and consecutively numbered with the same numbers as on said first dial but in the opposite direction and indicating the number of races run by said selected contestant, so that rotation of said second dial from a position where a numbered point thereon is in alignment with the same numbered point on said first dial to a position where the next adjacent numbered point on said second dial is in alignment with a similarly numbered point on the first dial will effect a displacement of said second dial equal to the space of two index points, except that said displacement from a position where the lowest numbered index points on said respective dials are in alignment to a position where the next higher numbered index points on said respective dials are in alignment will be equal to more than the space between two index points, a third dial of a smaller diameter than said second dials rotatably mounted on said post in superposed relation to said second dial and provided along its circumference with a series of consecutive even numbers indicating the relative chances of the contestants, arranged consecutively in the same direction as the numbers on the said second dial and adapted for visual radial alignment therewith, a pointer radially disposed on said third dial adapted for visual radial alignment with the spaced index points on said second dial, a bridging member extending from said post over said dials and rigidly fastened to said base plate and a window in said bridging member defined in part by upper and lower lines radial of said dials and adapted to disclose one of said even numbers on said third dial as determined by the simultaneous alignment of a selected numbered index point on said second dial with a similarly numbered index point on said first dial and of said pointer with a selected numbered index point on said second dial, said window being so positioned that when the lowest numbers on the first and third dials are in alignment the upper line of said window will be in diametrical alignment with said pointer.

MAX FLEISCHER.